US012767464B2

(12) United States Patent
Azuma et al.

(10) Patent No.: US 12,767,464 B2
(45) Date of Patent: Oct. 20, 2026

(54) CONVEYING DEVICE AND CONVEYING METHOD

(71) Applicant: HITACHI HIGH-TECH CORPORATION, Tokyo (JP)

(72) Inventors: Shinji Azuma, Tokyo (JP); Hiroshi Watanabe, Tokyo (JP); Shigeru Yano, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 158 days.

(21) Appl. No.: 18/837,932

(22) PCT Filed: Oct. 28, 2022

(86) PCT No.: PCT/JP2022/040468
§ 371 (c)(1),
(2) Date: Aug. 13, 2024

(87) PCT Pub. No.: WO2023/162340
PCT Pub. Date: Aug. 31, 2023

(65) Prior Publication Data

US 2025/0145393 A1 May 8, 2025

(30) Foreign Application Priority Data

Feb. 25, 2022 (JP) ................................ 2022-027567

(51) Int. Cl.
*B65G 54/02* (2006.01)
*B65G 43/08* (2006.01)
(Continued)

(52) U.S. Cl.
CPC ............ *B65G 54/02* (2013.01); *B65G 43/08* (2013.01); *B65G 2201/0235* (2013.01); *B65G 2203/0283* (2013.01)

(58) Field of Classification Search
CPC ....... B65G 43/08; B65G 54/02; H02P 25/064; H02K 11/215; H02K 41/031
(Continued)

(56) References Cited

U.S. PATENT DOCUMENTS 9,593,970 B2 * 3/2017 Sinz ...................... G01N 35/00
11,226,348 B2 * 1/2022 Vollenweider ......... G01N 35/04
(Continued)

FOREIGN PATENT DOCUMENTS

JP 2017-077971 A 4/2017
JP 2021-010254 A 1/2021
(Continued)

OTHER PUBLICATIONS

International Preliminary Report on Patentability, dated Aug. 27, 2024, for International Application No. PCT/JP2022/040468.
(Continued)

*Primary Examiner* — Douglas A Hess
(74) *Attorney, Agent, or Firm* — Baker Botts L.L.P.

(57) ABSTRACT

Provided are a conveying device and a conveying method capable of improving the position detection accuracy of the holder as compared with the related art. A conveying device 100 includes a coil 107 including a core 105 and a winding 106, a drive unit 108 that supplies a current to the winding 106, a current detection unit 109 that detects the value of the current flowing through the winding 106, and a control unit 110 that calculates the position of a holder 102, in which the control unit 110 calculates the position of the holder 102 based on the current value detected by the current detection unit 109 and the calibration curve obtained in advance, and changes the calibration curve used depending on how the drive voltage is applied by the drive unit 108.

12 Claims, 8 Drawing Sheets

(51) Int. Cl.
*G01N 35/04* (2006.01)
*H02K 11/215* (2016.01)

(58) Field of Classification Search
USPC .......................................................... 198/619
See application file for complete search history.

(56) References Cited

U.S. PATENT DOCUMENTS

| | | | | |
|---|---|---|---|---|
| 11,619,641 | B2 * | 4/2023 | Benedetti | G16H 50/20 422/65 |
| 11,772,911 | B2 * | 10/2023 | Aoyama | H02K 1/145 198/619 |
| 11,887,780 | B2 * | 1/2024 | Aoyama | H01F 7/064 |
| 11,933,801 | B2 * | 3/2024 | Aoyama | G01N 35/04 |
| 12,000,851 | B2 * | 6/2024 | Tanotra | G01N 35/00584 |
| 12,098,039 | B2 * | 9/2024 | Hoshi | G01N 35/04 |
| 12,325,599 | B2 * | 6/2025 | Tamakoshi | B65G 54/02 |
| 12,523,672 | B2 * | 1/2026 | Tamakoshi | G01N 35/04 |
| 2014/0234065 | A1 | 8/2014 | Heise et al. | |
| 2022/0252628 | A1 | 8/2022 | Tamakoshi et al. | |
| 2022/0274792 | A1 | 9/2022 | Tamakoshi et al. | |
| 2023/0184798 | A1 | 6/2023 | Kaneko et al. | |
| 2023/0211964 | A1 | 7/2023 | Kobayashi et al. | |

FOREIGN PATENT DOCUMENTS

| | | | |
|---|---|---|---|
| JP | 2021-058052 | A | 4/2021 |
| JP | 2021-196171 | A | 12/2021 |
| JP | 2021-196193 | A | 12/2021 |

OTHER PUBLICATIONS

International Search Report, mailed Dec. 27, 2022, for International Application No. PCT/JP2022/040468.

* cited by examiner

[FIG. 1]
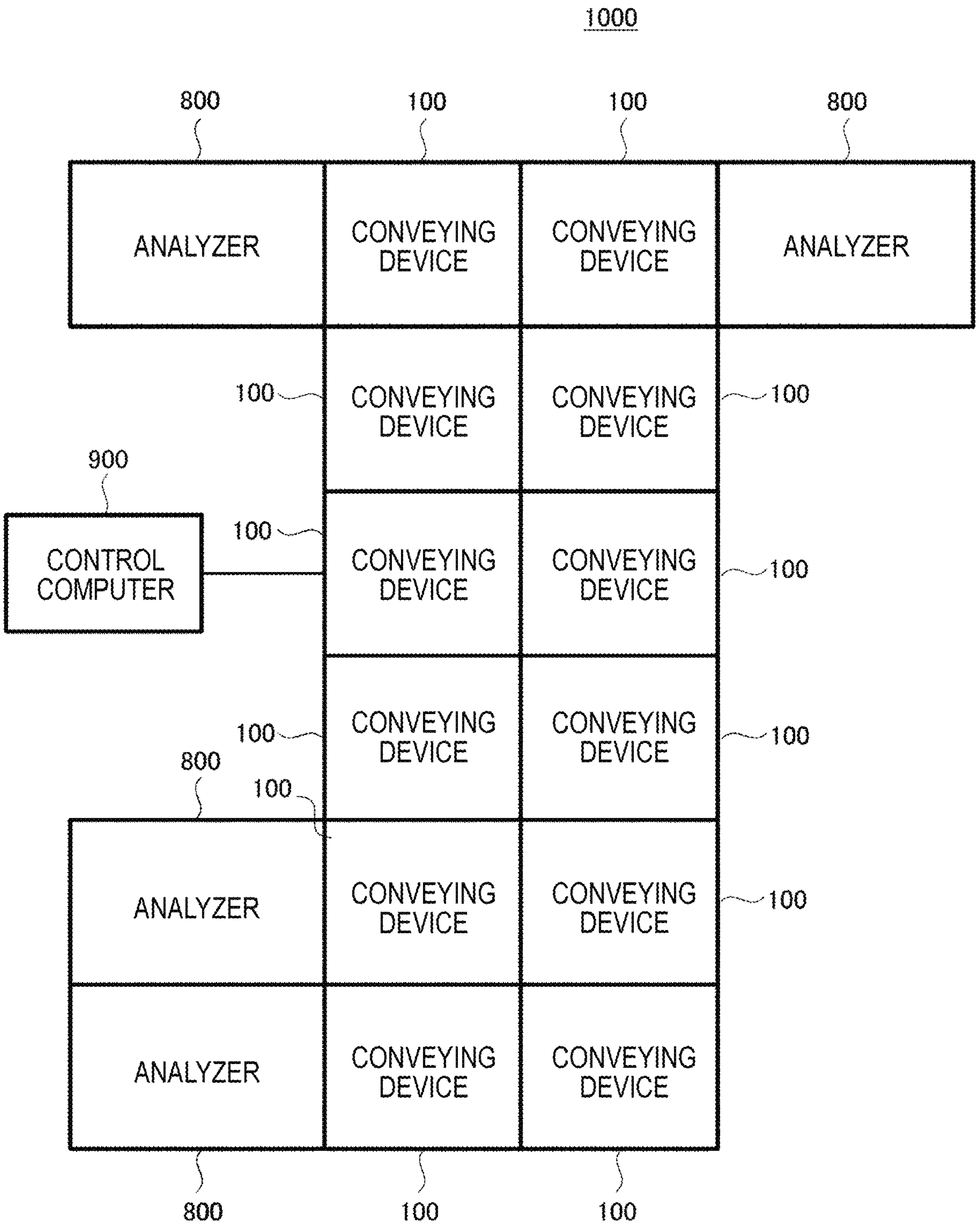

[FIG. 2]
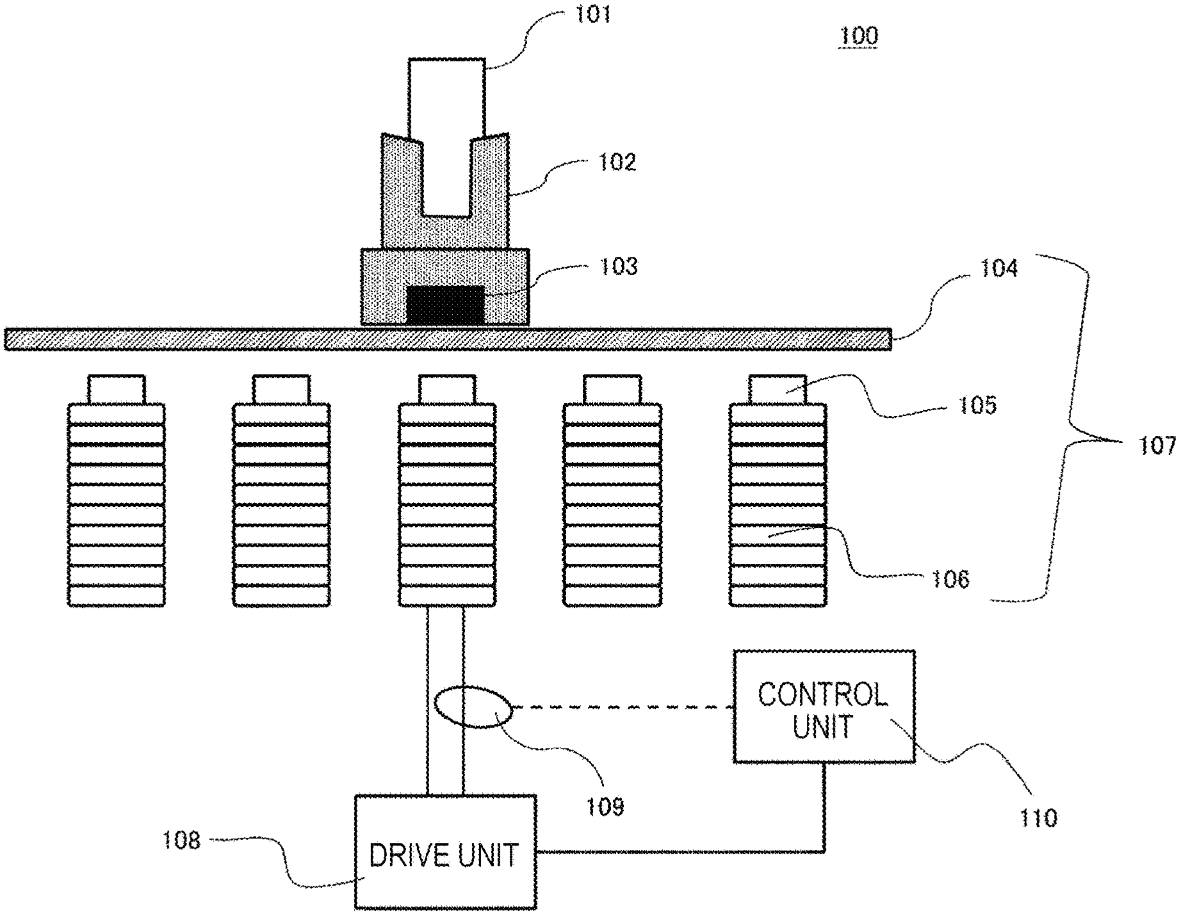

[FIG. 3]
(a)
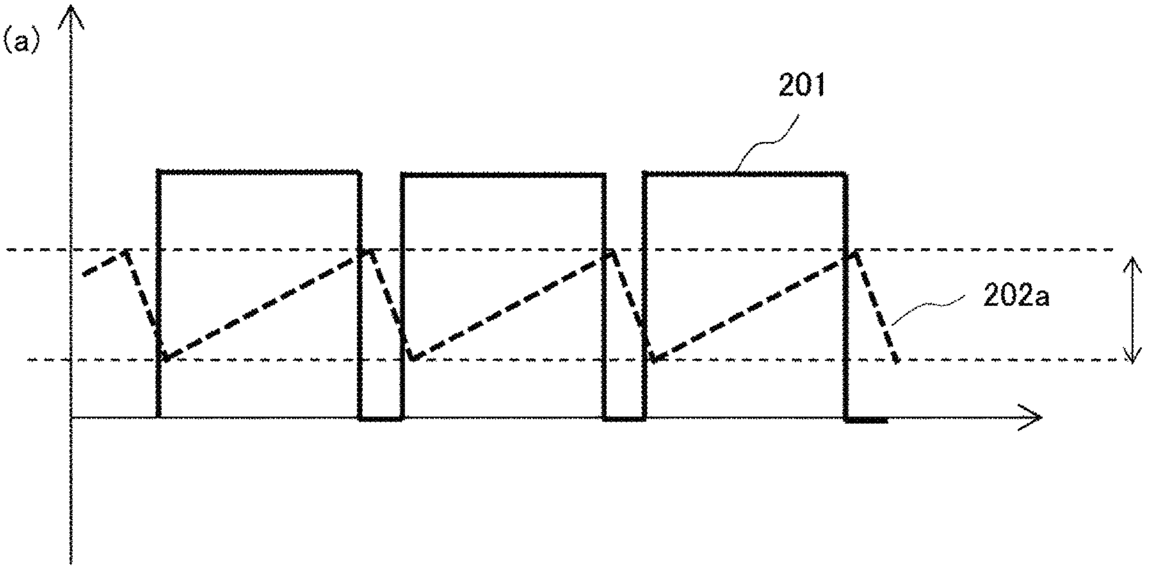
(b)
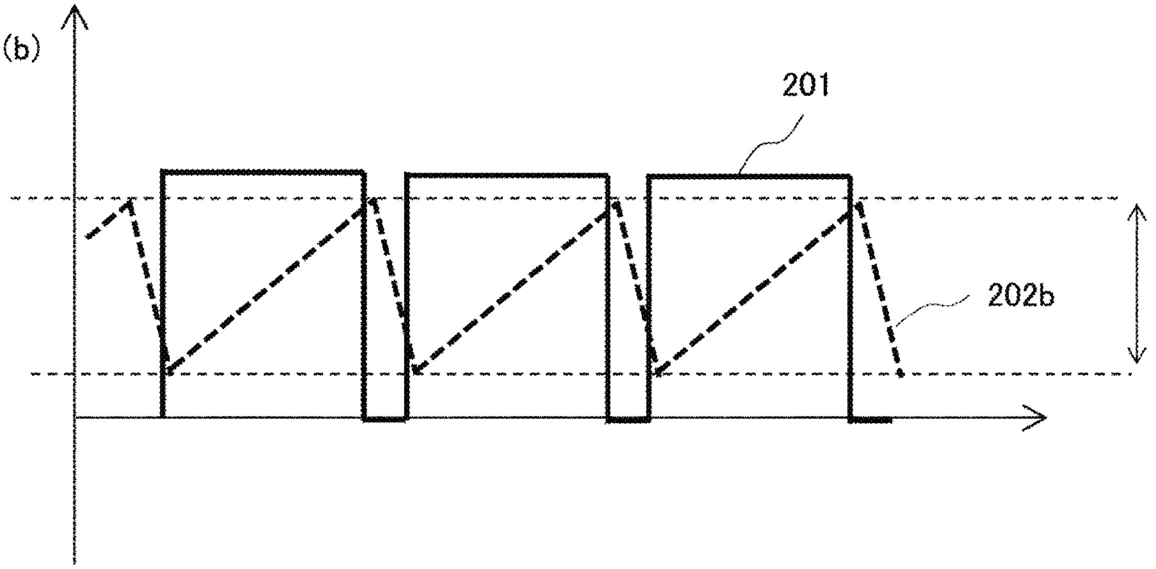

[FIG. 4]
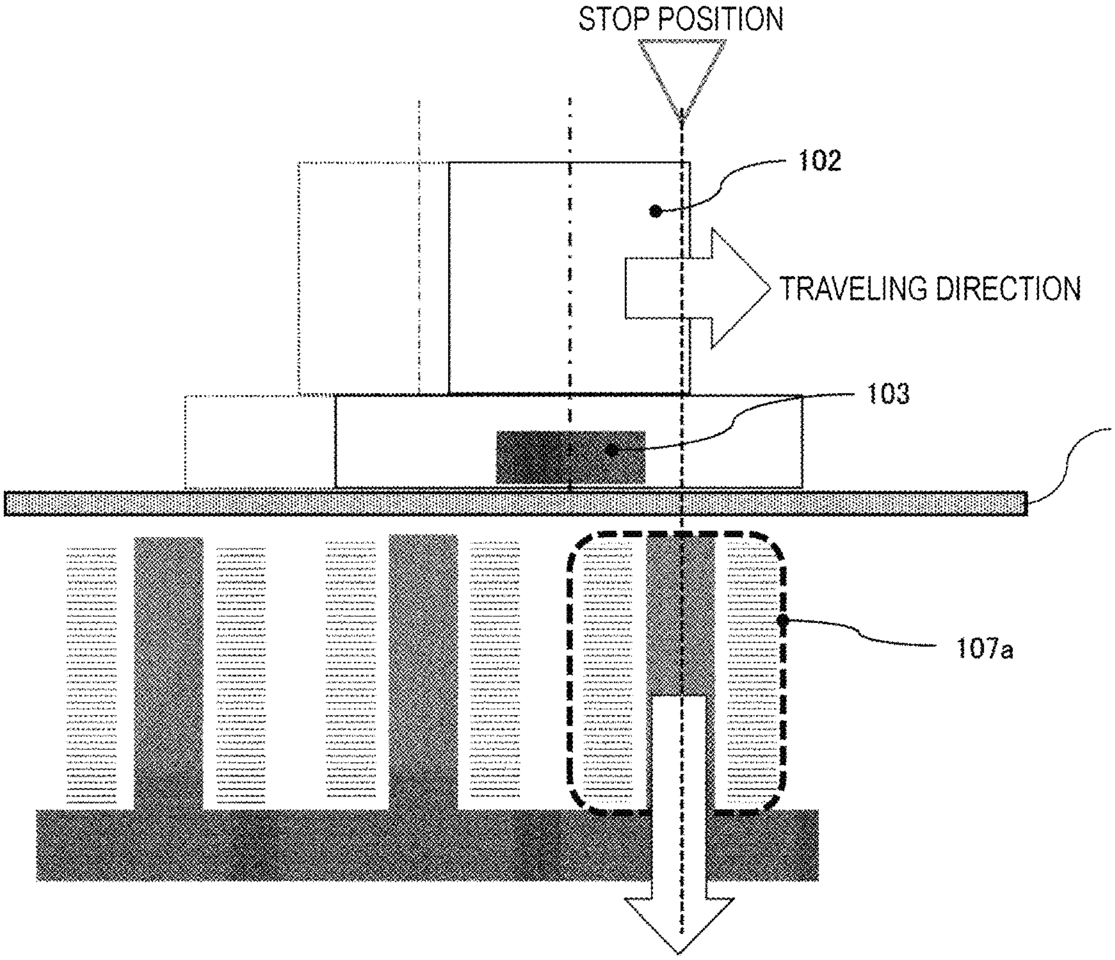

[FIG. 5]
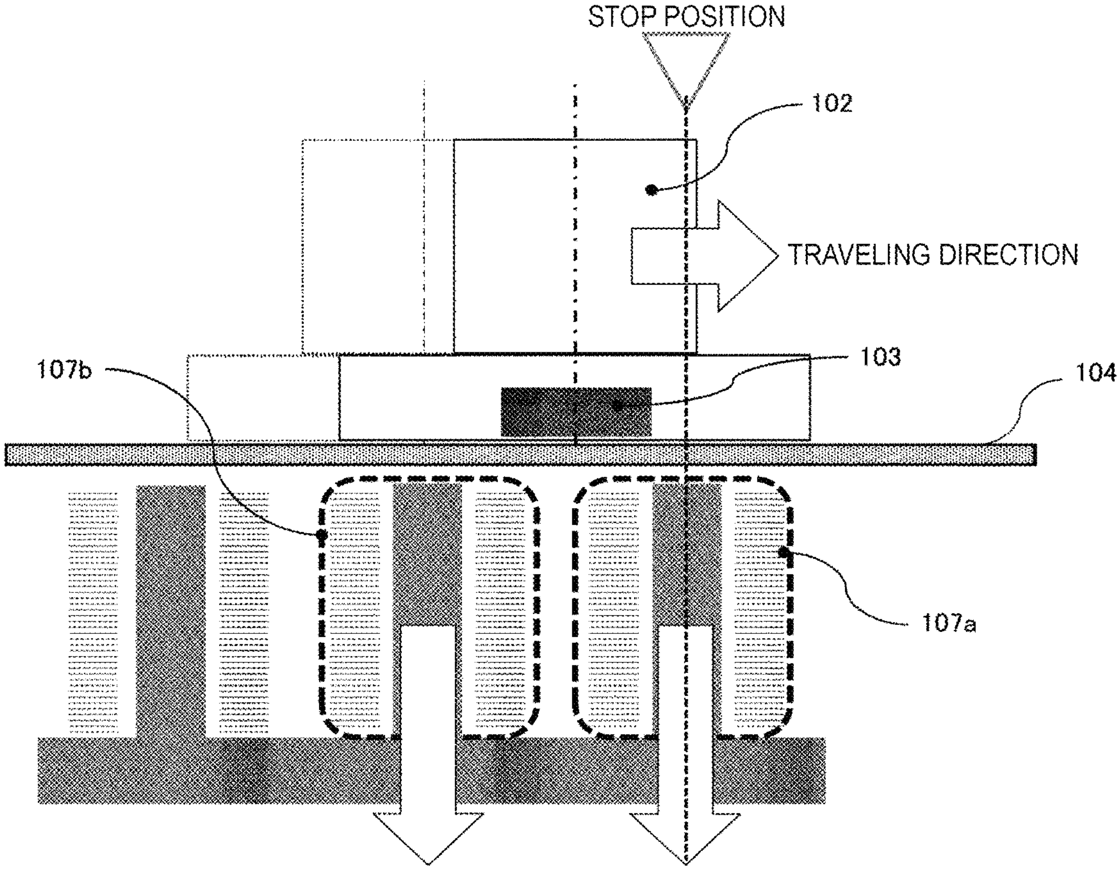
[FIG. 6]
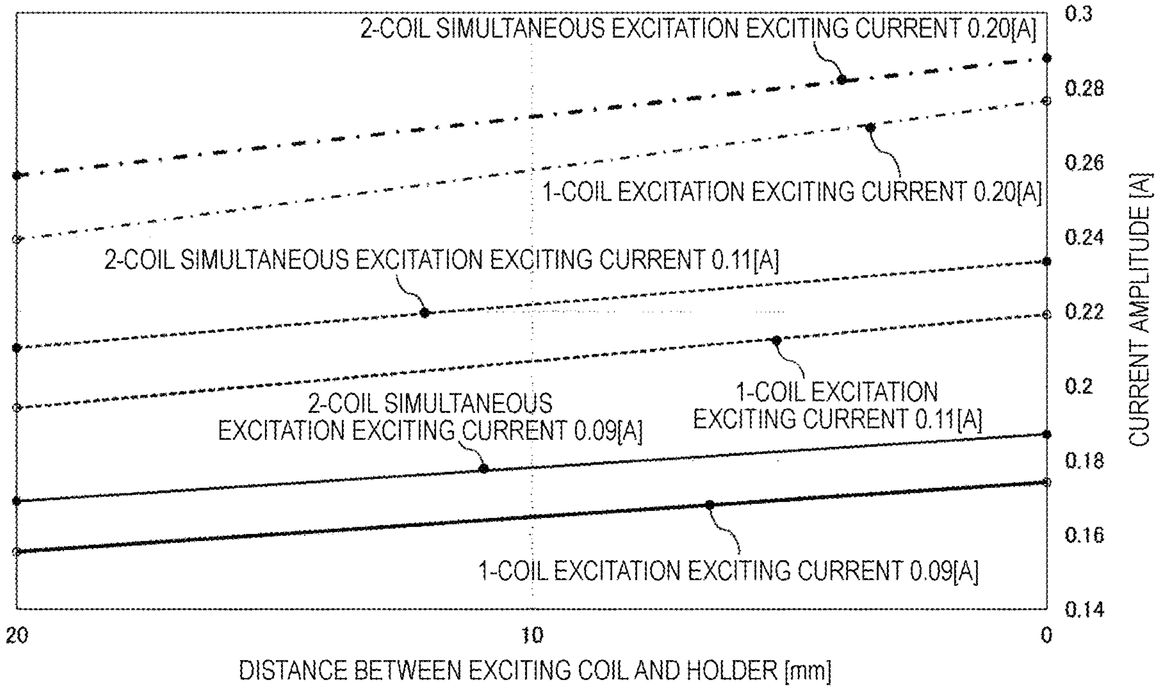

[FIG. 7]
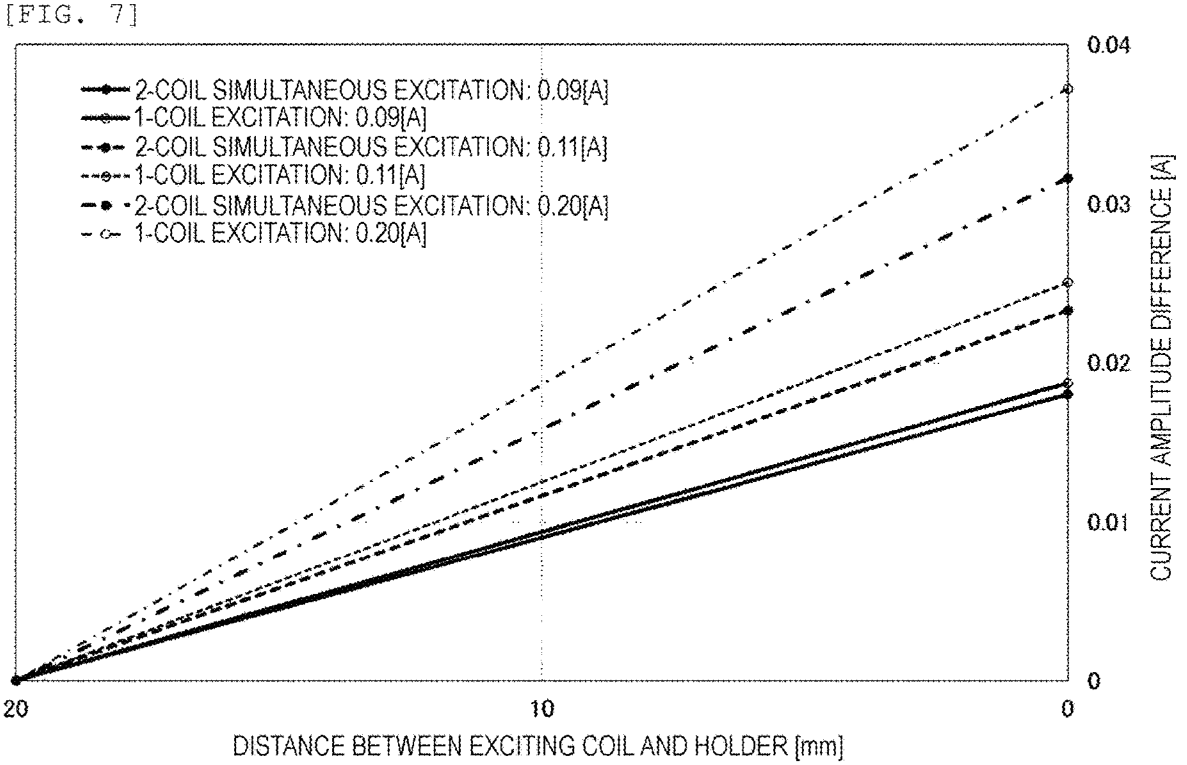
[FIG. 8]
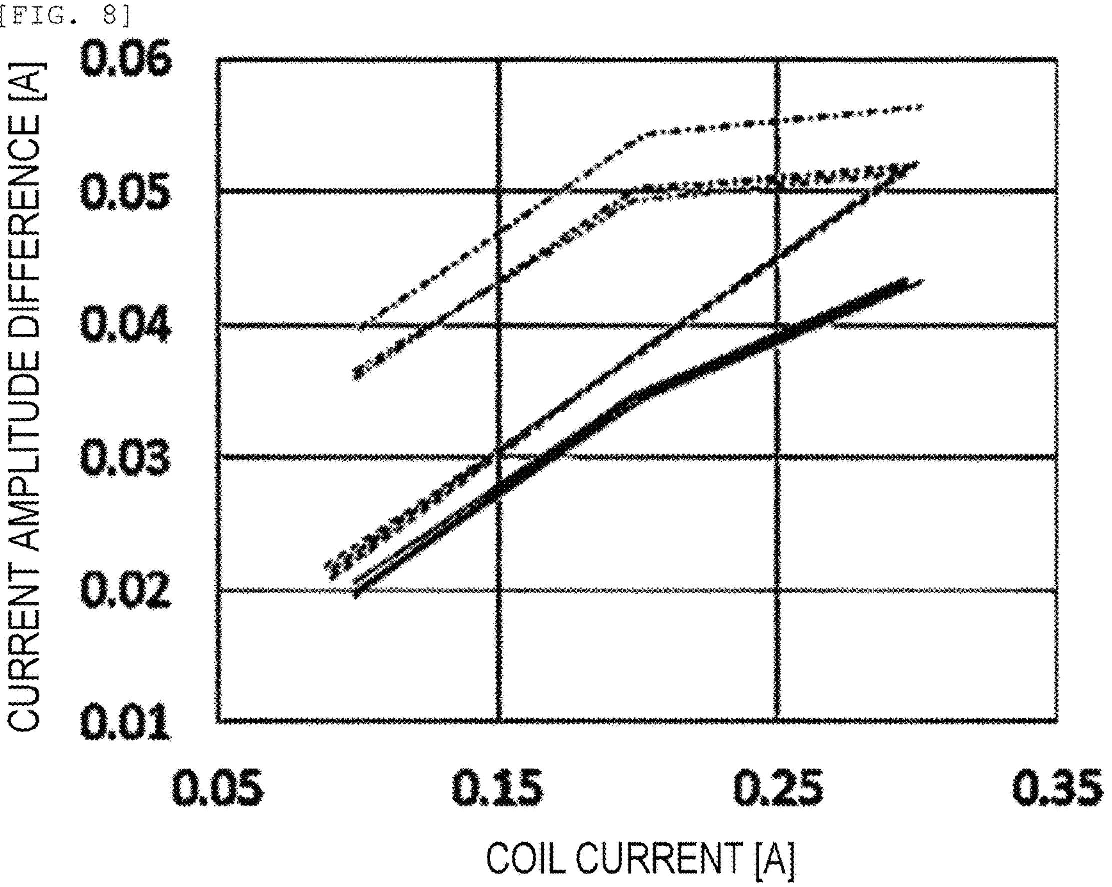

[FIG. 9]
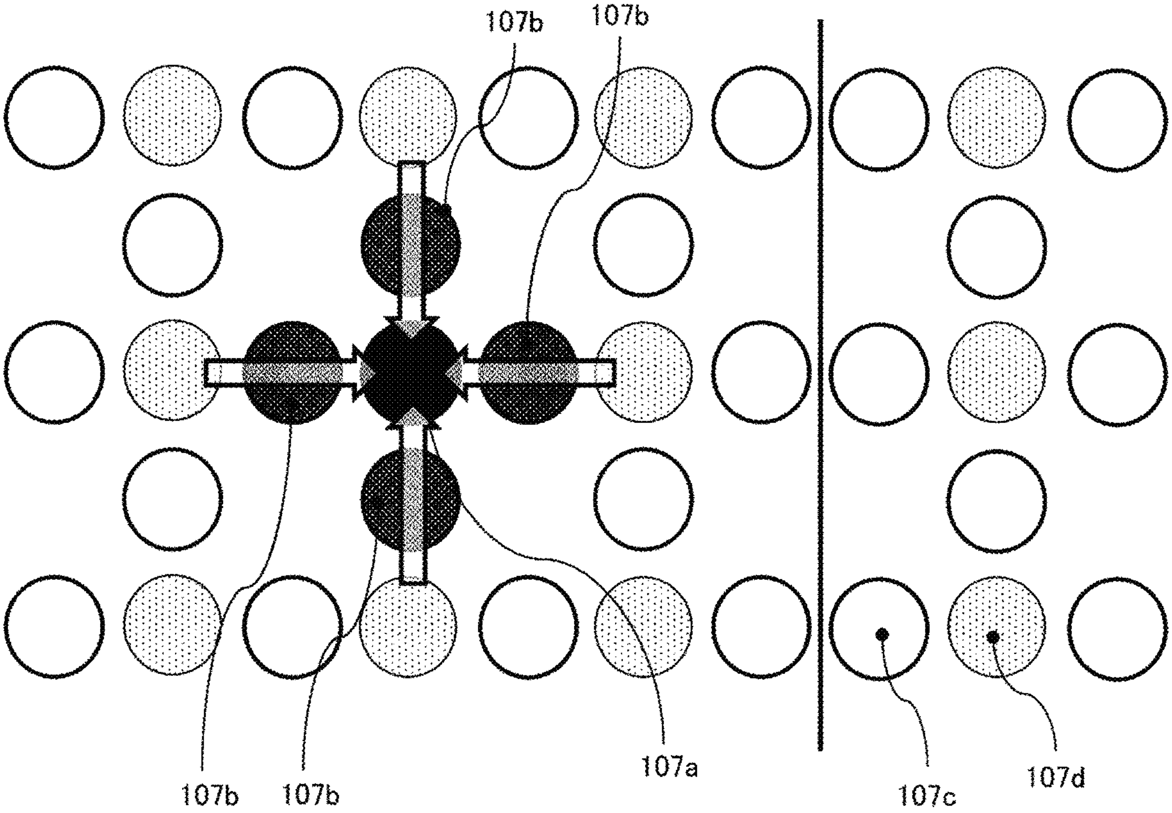
[FIG. 10]
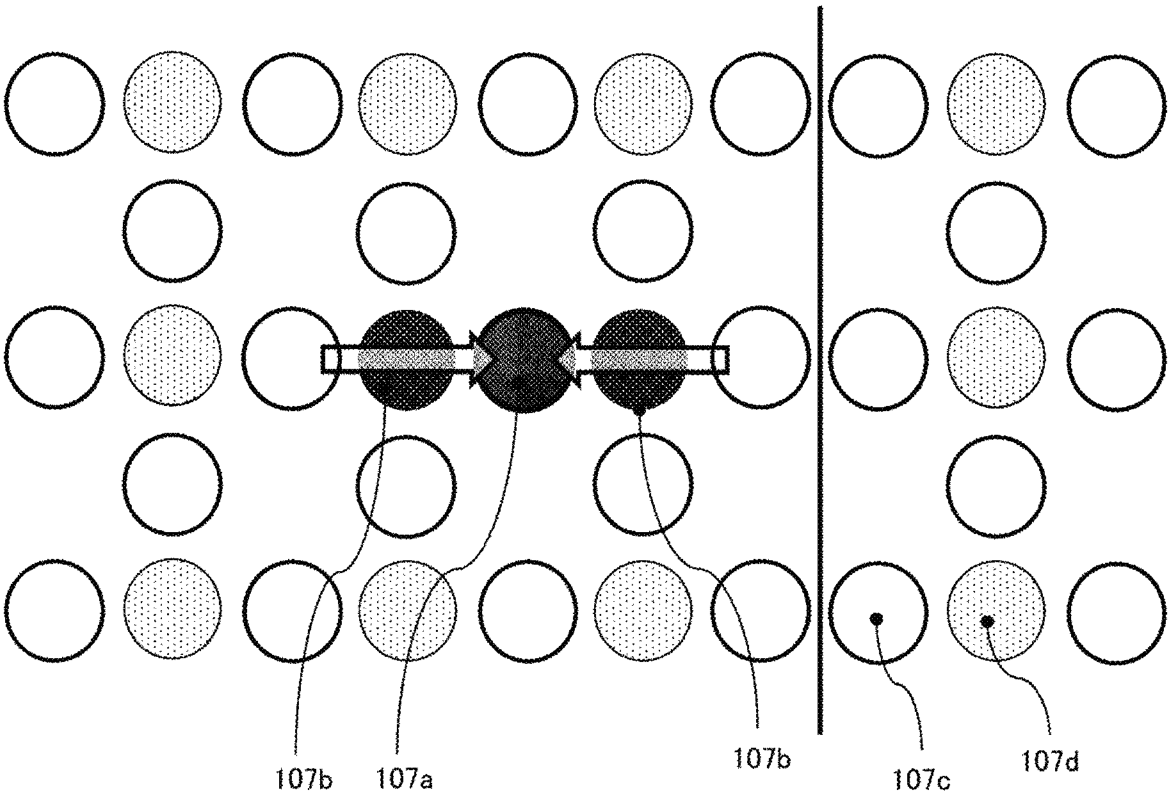

[FIG. 11]
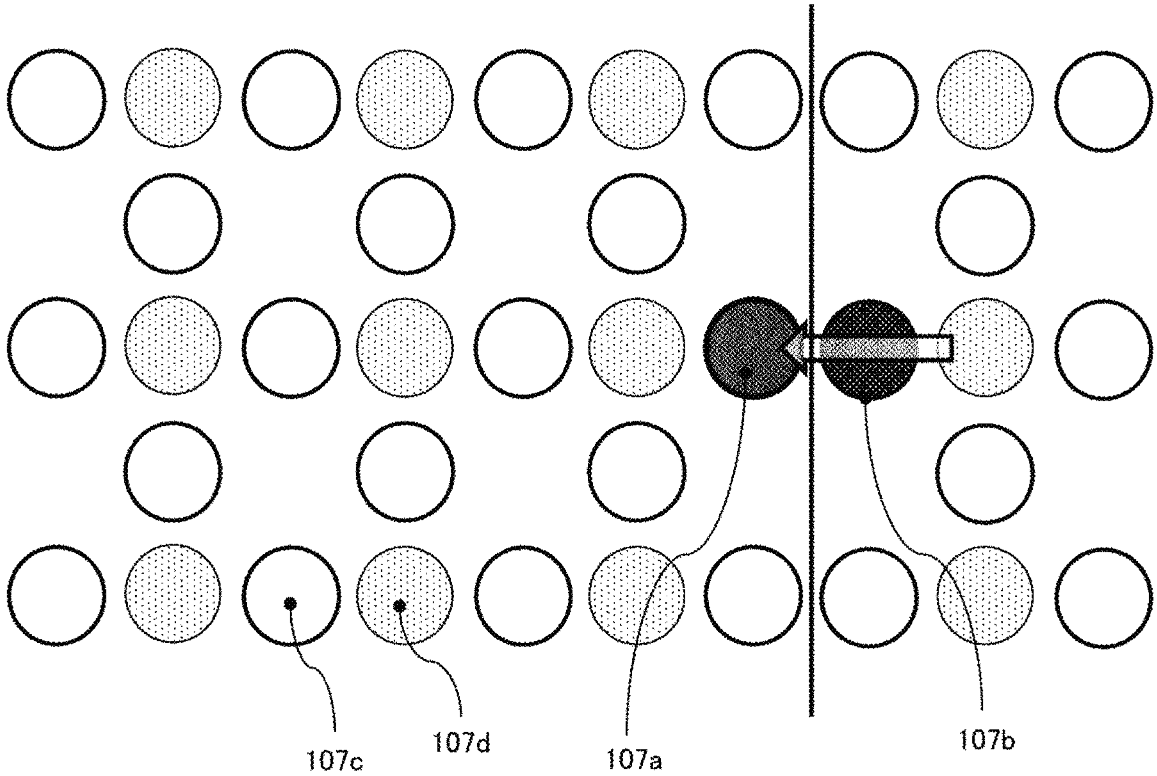

CONVEYING DEVICE AND CONVEYING METHOD

TECHNICAL FIELD

The present invention relates to a conveying device and a conveying method for conveying a sample.

BACKGROUND ART

As an example of a laboratory sample delivery system, which is highly flexible and has high conveyance performance, and a corresponding operation method, PTL 1 discloses a conveying device including: several holders, each including at least one magnetically active device, preferably at least one permanent magnet, and configured to carry a sample container; a conveying flat surface configured to carry the holder; and several electromagnetic actuators disposed in a stationary manner below the conveying flat surface and configured to move the holder on the conveying flat surface by applying a magnetic force to the holder.

CITATION LIST

Patent Literature

PTL 1: JP2017-77971A

SUMMARY OF INVENTION

Technical Problem

With advancement of medical care, importance of sample analysis is increasing. In order to improve analysis processing capability of a sample analysis system, high-speed conveyance, simultaneous large-scale conveyance, and multiple direction conveyance of samples are desired.

An example of such a technique is disclosed in PTL 1.

In the conveying device disclosed in PTL 1, in order to improve sample conveyance performance per area unit, a gap between adjacent container carriers (holders) is designed to be as small as possible. On the other hand, a thrust acting on the holder pulsates between coils by a force of the permanent magnet being attracted to a coil shaft or an electromagnetic force due to coil excitation, and it is necessary to stop the holder while controlling the thrust. Therefore, it is difficult to achieve high stop position accuracy, and depending on stop accuracy of a holder, the holder may interfere with an adjacent holder in the worst case.

In order to solve this problem, normally, when controlling the holder by applying a current to one coil, it is conceivable to simultaneously apply the current to both a coil disposed directly below a stop position and a coil immediately after passing and to improve stop position accuracy by a brake function of the coil immediately after passing.

Here, there is a technique for detecting a position of a holder having a magnetic material based on a current flowing through a winding of a coil when the current is applied to the coil.

Studies by the present inventors reveal that position detection accuracy of the holder deteriorates since a deviation occurs in a calibration curve used to detect the position of the holder between when the current is applied to one coil and when the current is simultaneously applied to two coils.

Therefore, an object of the invention is to provide a conveying device and a conveying method capable of improving position detection accuracy of a holder as compared with the related art.

Solution to Problem

The present invention includes a plurality of aspects for solving the above problems, and one aspect thereof provides a conveying device that conveys a conveying container including a magnet or a magnetic material, and the conveying device includes: a coil including a core and a winding; a drive unit that supplies a current to the winding; a current detection unit that detects the value of the current flowing through the winding; and a position detection unit that calculates the position of the conveying container. The position detection unit calculates the position of the conveying container based on the current value detected by the current detection unit and the calibration curve obtained in advance, and changes the calibration curve used depending on how the drive voltage is applied by the drive unit.

Advantageous Effects of Invention

According to the invention, position detection accuracy of the holder can be improved as compared with the related art. Problems, configurations, and effects other than those described above will become apparent in the following description of embodiments.

BRIEF DESCRIPTION OF DRAWINGS

FIG. 1 is a plan view showing the configuration of the entire sample analysis system including a conveying device according to an embodiment.

FIG. 2 is a top view showing an example of the configuration of the conveying device according to the embodiment.

FIG. 3 is a diagram schematically showing the differences between the applied voltage waveform and the corresponding current waveform depending on the magnitude of the inductance in the conveying device according to the embodiment.

FIG. 4 is a diagram showing the relationship between the exciting coil (1 coil) and the stop position of the holder in the conveying device according to the embodiment.

FIG. 5 is a diagram showing the relationship between the exciting coil (2 coils) and the stop position of the holder in the conveying device according to the embodiment.

FIG. 6 is a diagram showing the relationship of the current amplitude with respect to the distance between the exciting coil and the holder.

FIG. 7 is a diagram showing the relationship of the current amplitude difference with respect to the distance between the exciting coil and the holder.

FIG. 8 is a diagram showing the relationship between the current value flowing through the coil and the current amplitude difference.

FIG. 9 is a diagram showing an example of a pattern in which two coils are excited when the holder is stopped in the conveying device according to the embodiment.

FIG. 10 is a diagram showing an example of a pattern in which two coils are excited when the holder is stopped in the conveying device according to the embodiment.

FIG. 11 is a diagram showing an example of a pattern for exciting two coils when the holder is stopped in the conveying device according to the embodiment.

DESCRIPTION OF EMBODIMENTS

Hereinafter, embodiments of a sample conveying device and a sample conveying method according to the invention will be described with reference to the drawings. In the drawings used in the present specification, the same or corresponding components are denoted by the same or similar reference numerals, and repeated description thereof may be omitted.

In the following embodiments, it is needless to mention that components (also including element steps and the like) thereof are not necessarily essential unless otherwise specified or unless clearly considered to be essential in principle.

First, an overall configuration of a sample analysis system including a conveying device will be described with reference to FIG. 1. FIG. 1 is a plan view showing the overall configuration of the sample analysis system including the conveying device according to the present embodiment.

A sample analysis system 1000 according to the present embodiment shown in FIG. 1 is a system including an analyzer for automatically analyzing components in a sample such as blood and urine.

Main components of the sample analysis system 1000 are a plurality of conveying devices 100 (twelve in FIG. 1), each of which conveys, to a predetermined destination, a holder 102 (see FIG. 2) on which a sample container 101 (see FIG. 2 and the like) accommodating a sample is mounted or the empty holder 102 on which no sample container 101 is mounted, a plurality of analyzers 800 (four in FIG. 1), and a control computer 900 that integrally manages the sample analysis system 1000.

The analyzer 800 is a unit that performs qualitative and quantitative analysis on components in the sample conveyed by the conveying device 100. Analysis items in the unit are not particularly limited, and a configuration of a known automatic analyzer for analyzing biochemical items and immune items may be adopted. Further, when a plurality of analyzers are provided, the specifications may be the same as or different from each other, and are not particularly limited.

Each conveying device 100 is a device that conveys the sample container 101 accommodating the sample, which is mounted on the holder 102, to the destination (such as the analyzer 800 or a take-out port) by sliding on a conveying path by interaction between coils 107 (see FIG. 2) and a magnetic material 103 (see FIG. 2) provided on the holder 102. Details thereof will be described with reference to FIG. 2 and subsequent drawings.

The control computer 900 controls operations of the entire system including the conveying devices 100 and the analyzers 800, and is implemented by a computer including a display device or an input device such as a liquid crystal display, a storage device, a CPU, a memory, and the like. The operations of the devices are controlled by the control computer 900 based on various programs recorded in the storage device.

Operation control processing executed by the control computer 900 may be integrated into one program, may be divided into a plurality of programs, or may be a combination thereof. A part or all of the programs may be implemented by dedicated hardware or may be modularized.

FIG. 1 shows a case where four analyzers 800 are provided, and the number of analyzers 800 is not particularly limited and may be one or more. Similarly, the number of conveying devices 100 is not particularly limited and may be one or more.

The sample analysis system 1000 may be provided with various types of sample pre-treatment and post-treatment units that perform pre-treatment and post-treatment on the sample. A detailed configuration of the sample pre-treatment and post-treatment unit is not particularly limited, and a configuration of a known pre-treatment device may be adopted.

Next, a configuration of the conveying device 100 according to the present embodiment will be described with reference to FIG. 2 and subsequent drawings.

First, the conveying device according to the embodiment of the invention will be described with reference to FIG. 2. FIG. 2 is a configuration diagram of the conveying device according to the invention.

In FIG. 2, the sample container 101 accommodating the sample is installed in the holder 102. The magnetic material 103 is provided on a bottom surface of the holder 102.

The magnetic material 103 may be made of a permanent magnet, another magnet, a soft magnetic material, or the like. Although it is not necessary to provide the magnetic material 103 on a lower surface of the holder 102, it is desirable to provide the magnetic material 103 on the lower surface from a viewpoint of efficiently applying a conveying force in the conveying method according to the invention.

The holder 102 slides on a conveying surface 104. Therefore, a plurality of coils 107 each including a cylindrical core 105 and a winding 106 wound around an outer periphery of the core 105 are disposed below the conveying surface 104.

A drive unit 108 is connected to the winding 106 constituting each coil 107, and a predetermined voltage is applied to the coil 107 from the drive unit 108, whereby a predetermined current can flow through the winding 106.

At this time, the coil 107 is excited to act as an electromagnet, and attracts the magnetic material 103 provided on the lower surface of the holder 102 on the conveying surface 104. By repeating this procedure for all the coils 107 constituting the conveying path to a target position, the sample container 101 installed in the holder 102 can be conveyed to the destination on the conveying surface 104.

Generally, when a voltage is applied to the coil 107 to cause a current to flow, a magnetic field is generated around the coil 107, and a magnitude of a generated magnetic flux is proportional to a value of the flowing current. This proportional constant is referred to as an inductance.

When the holder 102 is present near the coil 107, a magnetic flux (magnetic field) generated by the magnetic material 103 is generated in the core 105. The magnetic flux (magnetic field) generated by the magnetic material 103 and the magnetic flux (magnetic field) generated by the current flowing through the coil 107 are generated in the core 105. In particular, a magnitude of the magnetic flux generated in the core 105 varies depending on relative positions of the magnetic material 103 and the coil 107.

On the other hand, the core 105 is made of a magnetic material, and the magnetic flux passing through the core 105 has a property of being difficult to pass as the magnetic flux increases. This property is known as magnetic saturation. Therefore, in a magnetic circuit having a magnetic material such as the core 105, when the magnetic flux generated in the core 105 increases and saturation of the core 105 occurs, the inductance decreases. That is, when the magnetic field from the magnetic material 103 becomes large and the magnetic saturation occurs in the core 105, permeability becomes small, and thus the current flowing through the winding 106 (coil 107) changes.

FIG. 3 shows waveform diagrams each showing a voltage waveform 201 applied to the coil 107 by the conveying device and a current waveform corresponding thereto. (a) of FIG. 3 shows the voltage waveform 201 applied to the coil 107 and a current waveform 202*a* flowing through the coil 107 when the holder 102 is not present in the vicinity of the coil 107. (b) of FIG. 3 shows the voltage waveform 201 applied to the coil 107 and a current waveform 202*b* flowing through the coil 107 when the magnetic material 103 for the holder 102 approaches the coil 107 and the core 105 is magnetically saturated.

That is, when the coil 107 is not affected by the magnetic material 103 of the holder 102, a current amplitude shown in (a) of FIG. 3 is obtained. On the other hand, when the magnetic material 103 for the holder 102 is present in the vicinity of the coil 107 and the coil 107 is affected by the magnetic material 103, a current amplitude becomes larger than that in (a) of FIG. 3 as shown in (b) of FIG. 3.

Accordingly, it can be said that the current amplitude changes depending on a distance between the holder 102 and the coil 107, and that the distance between the holder 102 and the coil 107, that is, a position of the holder 102 can be estimated based on a difference in the current amplitude.

The current flowing through the winding 106 of the coil 107 during conveyance is detected by a current detection unit 109. The current flowing through the winding 106 of the coil 107 detected by the current detection unit 109 is digitized by a control unit 110.

The control unit 110 according to the present embodiment calculates a position of the holder 102 based on a current flowing through the winding 106 of the coil 107 detected by the current detection unit 109. In the present embodiment, in particular, the position of the holder 102 is calculated based on a current value detected by the current detection unit 109 at that time and a calibration curve obtained in advance, and the calibration curve to be used is changed depending on how a drive voltage is applied by the drive unit 108.

The control unit 110 may be a part of the control computer 900 described above, or may be independent.

Next, details of control processing by the control unit 110 will be described with reference to FIG. 4 and the subsequent drawings.

First, a background of the invention will be described with reference to FIGS. 4 to 8. FIG. 4 is a diagram showing a relationship between an exciting coil (one coil) and a stop position of the holder, and FIG. 5 is a diagram showing a relationship between exciting coils (two coils) and the stop position of the holder. FIG. 6 is a diagram showing a relationship of an current amplitude with respect to a distance between the exciting coil and the holder, FIG. 7 is a diagram showing a relationship of a current amplitude difference with respect to the distance between the exciting coil and the holder, and FIG. 8 is a diagram showing a relationship between a current value flowing through the coil and the current amplitude difference.

As described above, in the electromagnetic conveyance, the sample container 101 is conveyed via the holder 102. Specifically, the coil 107, which is present directly below a traveling direction and directly above which the holder 102 is about to pass, is excited. Accordingly, the holder 102 moves while being in contact with the conveying surface 104. Similarly, when stopping the holder 102 directly above the coil 107 at the stop position, a coil 107*a* for stop, which is present directly below the traveling direction and is about to stop the holder 102 directly above, is excited (see FIG. 4).

Here, when the holder 102 is moved, a bottom of the holder 102 slides on an upper surface of the conveying surface 104. Therefore, by reducing friction between the bottom of the holder 102 and the upper surface of the conveying surface 104 occurring during the sliding, the holder 102 can be conveyed in an energy-saving manner.

However, low sliding friction requires energy when decelerating the holder 102. This is because it is necessary to provide the energy for deceleration to an extent that a deceleration brake due to the friction no longer works.

In the electromagnetic conveyance, a current corresponding to the energy is the current applied to the coil 107.

Therefore, in order to decelerate the holder 102, a current is applied to the coil 107 to apply an attractive force to the holder 102 that passes by, on a lower side of the conveying surface 104. This serves as a brake function (see FIG. 5).

In order to stop the holder 102, it is also required to reduce a positional deviation from directly above the predetermined coil 107, and highly accurate stop control is required.

In particular, in order to achieve a highly accurate stop position, instead of exciting only the coil 107*a* for stop as shown in FIG. 4, it is desirable to simultaneously apply the current to two coils 107 including the coil 107*a* for stop and a coil 107*b* immediately after passing as shown in FIG. 5.

In this case, the coil 107*a* for stop located in front of the holder 102 functions to pull the front of the holder 102 to the stop position. On the other hand, the coil 107*b* immediately after passing located behind the holder functions to apply a brake to the holder 102.

However, as a result of intensive studies by the present inventors, it has become clear that characteristics of the calibration curve are different between when only the single coil 107 is excited and when the two coils 107 are simultaneously excited.

More specifically, as shown in FIG. 7, it has become clear that the current amplitude with respect to the distance between the exciting coil and the holder is different between when the two coils 107 are simultaneously excited and when the single coil 107 is excited.

For example, when an exciting current of the coil 107 is 0.09 [A], the current amplitude at the time of two-coil simultaneous excitation is larger than the current amplitude at the time of one-coil excitation. This is the same when the exciting current of the coil 107 is 0.11 [A] or 0.20 [A]. This is due to influence of magnetic saturation, and it is easily imagined that the characteristics are similarly different when three or more coils are simultaneously excited.

Here, the calibration curve refers to a graph showing correspondence between the detected current value and the position of the holder 102, which are measured and obtained in advance, and is, for example, a relationship as shown in FIG. 7.

Therefore, in the present embodiment, the control unit 110 estimates the holder position based on the value of the current that flows when the drive voltage is applied, and changes the calibration curve depending on how the drive voltage is applied. When the drive voltage is simultaneously applied to a plurality of coils 107, the calibration curve for simultaneous excitation of the plurality of coils is used.

At this time, the calibration curve for simultaneous excitation of the plurality of coils can be obtained under a condition that the same number of coils 107 are excited in a state of having no holder 102. For example, the calibration curve for simultaneous excitation of two adjacent coils is obtained under a condition that two adjacent coils are simultaneously excited without the holder 102. The reason for this will be described below with reference to FIG. 8.

In FIG. 8, broken lines indicate differences in current amplitude values obtained under conditions with the holder 102 (one-coil excitation) and without the holder 102 (one-coil excitation), solid lines indicate differences in current amplitude values obtained under conditions two-coil excitation (with the holder) and without the holder (two-coil excitation) in four directions of upper, lower, left, and right (see FIG. 9), and dashed-dotted lines indicate differences in current amplitude values obtained under the conditions with the holder 102 (two-coil excitation) and without the holder 102 (one-coil excitation) in the four directions of upper, lower, left, and right. A reason why there are the conditions in the four directions of the upper, lower, left, and right (see FIG. 9) in the two-coil simultaneous excitation is because current characteristics differ depending on coil positions in the upper, lower, left, and right directions.

As shown in FIG. 8, the four dashed-dotted lines, indicating the differences in the current amplitude values obtained under the conditions with the holder 102 (two-coil excitation) and without the holder 102 (one-coil excitation), have large deviations.

In comparison with this, it can be seen that the four solid lines, indicating the differences in the current amplitude values obtained under the conditions of the two-coil excitation (with the holder) and without the holder (two-coil excitation), have small deviations despite the two-coil simultaneous excitation, and it is possible to cancel out different current characteristics depending on coil positions.

Therefore, as the calibration curve for two-coil simultaneous excitation, it is desirable to use the calibration curve obtained under a condition that the same number of coils 107 are excited in a state of having no holder 102.

Here, in the conveying device 100, the coils 107 are spread out, and when a single coil 107 is excited, if the holder 102 is present on a coil 107 adjacent to the excited coil 107 in the upper, lower, left, and right directions, the holder 102 is attracted. That is, the plurality of mounted holders 102 may easily collide with one another.

In order to more reliably prevent this, it is desirable to arrange the coils 107 in a lattice pattern with alternately arranged columns and rows as shown in FIG. 9 and the like without densely laying the coils 107. In this case, in particular, a coil at a position where the coils 107 adjacent in the upper, lower, left and right directions in FIG. 9 and the like are present is a coil **107*d* that stops the holder 102, and a coil at a position where the coils 107 adjacent in an upper-lower direction or a left-right direction are present is a coil 107*c* that does not stop the holder 102**.

Accordingly, the coil 107 can be omitted in areas outside the conveying path, and an additional effect of reducing a component cost and a weight can be obtained.

In this case, there are a total of seven excitation patterns for two-coil simultaneous excitation, as shown in FIGS. 9 to 11 below. FIGS. 9 to 11 are diagrams showing examples of the pattern for exciting two coils when stopping the holder.

As shown in FIG. 9, the calibration curve for simultaneous excitation of a plurality of coils includes four patterns of movement from the coil **107*c* that does not stop the holder 102 to the coil 107*d* that stops the holder 102**.

As shown in FIG. 10, there are two patterns of movement from the coil **107*d* that stops the holder 102 to the coil 107*c* that does not stop the holder 102**.

Further, as shown in FIG. 11, there is one pattern of movement from the coil **107*c* that does not stop the holder 102 to the coil 107*c* that does not stop the holder 102**.

Returning to FIG. 6, it has become clear that a current amplitude difference is different not only when a plurality of coils are simultaneous excited, but also when one coil 107 is excited and an absolute value of a current value applied to the coil 107 is different.

Specifically, even in the case of one-coil excitation, the current amplitude difference is different when the applied current value is 0.09 [A], 0.11 [A], and 0.20 [A]. This is the same in the case of simultaneous excitation of a plurality of coils, and it can be seen that even when the plurality of coils are simultaneously excited by the same number, the current amplitude value is different if the absolute value of the applied current value is different.

Therefore, the control unit 110 according to the present embodiment uses a calibration curve for single coil excitation when a drive voltage is applied to the single coil 107, and in particular, when the drive voltage is applied to the single coil 107, the calibration curve is changed according to an applied current value.

Similarly, when a drive voltage is simultaneously applied to the plurality of coils 107, the control unit 110 according to the present embodiment uses a calibration curve for excitation of the plurality of coils, and the calibration curve is changed according to an applied current value.

Next, effects of the present embodiment will be described.

The conveying device 100 according to the present embodiment described above includes the coil 107 including the core 105 and the winding 106, the drive unit 108 that supplies a current to the winding 106, the current detection unit 109 that detects a value of the current flowing through the winding 106, and the control unit 110 that calculates a position of the holder 102. The control unit 110 calculates the position of the holder 102 based on the current value detected by the current detection unit 109 and a calibration curve obtained in advance, and changes the calibration curve used depending on how a drive voltage is applied by the drive unit 108. Therefore, position detection accuracy of the holder can be improved as compared with the related art.

When a drive voltage is simultaneously applied to a plurality of coils 107, using a calibration curve for simultaneous excitation of the plurality of coils, the control unit 110 can maintain the position detection accuracy of the holder 102 and stop the holder 102 at a target position with high accuracy at the time of stopping the holder 102. Although the effect varies depending on the applied current value, a deviation in position detection of about 30% can be eliminated.

In particular, when the drive voltage is simultaneously applied to the plurality of coils 107, the effect can be improved by changing the calibration curve according to the applied current value.

Further, the control unit 110 uses a calibration curve for single coil excitation when a drive voltage is applied to the single coil 107, and in particular, when the drive voltage is applied to the single coil 107, the control unit 110 changes the calibration curve according to an applied current value, thereby maintaining the position detection accuracy of the holder 102 and stopping the holder 102 at a target position with high accuracy at the time of stopping the holder 102.

The calibration curve for simultaneous excitation of the plurality of coils can be created with higher accuracy using the calibration curve obtained under a condition that the same number of coils 107 are excited in a state of having no holder 102, and the position detection accuracy of the holder 102 can be further improved.

Further, the calibration curve for simultaneous excitation of the plurality of coils can cover all necessary patterns by including four patterns of movement from the coil **107*c* that does not stop the holder 102 to the coil 107*d* that stops the holder 102, two patterns of movement from the coil 107*d* that stops the holder 102 to the coil 107*c* that does not stop the holder 102, and one pattern of movement from the coil 107***c* that does not stop the holder 102 to the coil 107*c* that does not stop the holder 102.

<Others>

The invention is not limited to the embodiments described above, and various modifications and applications are possible. The embodiments described above are described in detail for easy understanding of the invention, and are not necessarily limited to those having all the configurations described above.

REFERENCE SIGNS LIST

100: conveying device
101: sample container
102: holder
103: magnetic material
104: conveying surface
105: core
106: winding
107: coil
107*a*: coil for stop
107*b*: coil immediately after passing
107*c*: coil that does not stop a holder
107*d*: coil that stops a holder
108: drive unit
109: current detection unit
110: control unit
201: voltage waveform
202*a*: current waveform
202*b*: current waveform
800: analyzer
900: control computer
1000: sample analysis system

The invention claimed is:

1. A conveying device that conveys a conveying container including a magnet or a magnetic material, comprising
a coil including a core and a winding;
a drive unit that supplies a current to the winding;
a current detection unit that detects a value of the current flowing through the winding; and
a control unit that calculates the position of the conveying container, wherein
the control unit
calculates the position of the conveying container based on the current value detected by the current detection unit and a calibration curve obtained in advance, and
changes the calibration curve used depending on how a drive voltage is applied by the drive unit.

2. The conveying device according to claim 1, wherein the control unit uses a calibration curve for simultaneous excitation of a plurality of coils when a drive voltage is applied to the plurality of coils at the same time.

3. The conveying device according to claim 2, wherein when a drive voltage is applied to a plurality of the coils at the same time, the control unit changes the calibration curve according to the applied current value.

4. The conveying device according to claim 2, wherein the calibration curve for simultaneous excitation of a plurality of coils is obtained under a condition that only the same number of coils are excited in a state of having no conveying container.

5. The conveying device according to claim 2, wherein the calibration curve for simultaneous excitation of the plurality of coils includes
four patterns of movement from the coil where the conveying container does not stop to the coil where the conveying container may stop,
two patterns of movement from the coil where the conveying container may stop to the coil where the conveying container does not stop, and
one pattern of movement from the coil where the conveying container does not stop to the coil where the conveying container does not stop.

6. The conveying device according to claim 1, wherein the control unit uses a calibration curve for single coil excitation when a drive voltage is applied to the single coil.

7. The conveying device according to claim 6, wherein the control unit changes the calibration curve according to the applied current value when a drive voltage is applied to the single coil.

8. A conveying method of a sample contained in a sample container held in a conveying container equipped with a magnet or a magnetic material, comprising:
applying a current to a coil selected for attracting or repelling the conveying container from among a plurality of coils each having a core and a winding to excite the coil; and
changing a calibration curve used depending on how a drive voltage is applied when calculating a position of the conveying container based on a value of the current flowing through the coil and the calibration curve obtained in advance.

9. The conveying method according to claim 8, wherein if a drive voltage is applied to a plurality of the coils at the same time during the position calculation, a calibration curve for simultaneous excitation of the plurality of coils is used.

10. The conveying method according to claim 9, wherein the calibration curve is changed according to the applied current value during the position calculation.

11. The conveying method according to claim 8, wherein if a drive voltage is applied to a single coil during the position calculation, a calibration curve for single coil excitation is used.

12. The conveying method according to claim 11, wherein the calibration curve is changed according to the applied current value during the position calculation.

* * * * *